(12) United States Patent
Miflin

(10) Patent No.: US 7,527,340 B2
(45) Date of Patent: May 5, 2009

(54) APPARATUS FOR CONTROLLING A BRAKING SYSTEM

(75) Inventor: Rodney Miflin, Corsham (GB)

(73) Assignee: Westinghouse Brakes (UK) Limited, Chippenham, Wiltshire (GB)

( * ) Notice: Subject to any disclaimer, the term of this patent is extended or adjusted under 35 U.S.C. 154(b) by 0 days.

(21) Appl. No.: 10/239,720

(22) PCT Filed: Feb. 16, 2001

(86) PCT No.: PCT/GB01/00666

§ 371 (c)(1),
(2), (4) Date: Nov. 14, 2002

(87) PCT Pub. No.: WO01/62568

PCT Pub. Date: Aug. 30, 2001

(65) Prior Publication Data

US 2003/0107261 A1    Jun. 12, 2003

(30) Foreign Application Priority Data

Feb. 25, 2000  (GB) ................... 0004584.9

(51) Int. Cl.
*B60T 8/18* (2006.01)

(52) U.S. Cl. .............. 303/22.4; 303/9.61; 303/9.63; 303/22.7

(58) Field of Classification Search ............ 303/3, 303/9, 15, 9.61, 9.63, 122.04, 20, 42, 22.4, 303/22.6, 22.7
See application file for complete search history.

(56) References Cited

U.S. PATENT DOCUMENTS

| | | | |
|---|---|---|---|
| 4,344,138 A | * | 8/1982 | Frasier ................... 701/70 |
| 5,586,813 A | | 12/1996 | McKay et al. |
| 5,833,325 A | | 11/1998 | Hart |
| 5,934,764 A | | 8/1999 | Dimsa et al. |

FOREIGN PATENT DOCUMENTS

| EP | 0373315 B1 | 7/1992 |
|---|---|---|
| EP | 0738641 B1 | 10/1996 |
| GB | 2131508 A | 12/1983 |

* cited by examiner

*Primary Examiner*—Xuan Lan Nguyen
(74) *Attorney, Agent, or Firm*—Husch Blackwell Sanders LLP Welsh & Katz

(57) ABSTRACT

Apparatus for controlling a pneumatic brake system that includes an electronic control device to limit the maximum brake effort even when an external electrical power supply to the braking system is not present.

Figure 1:
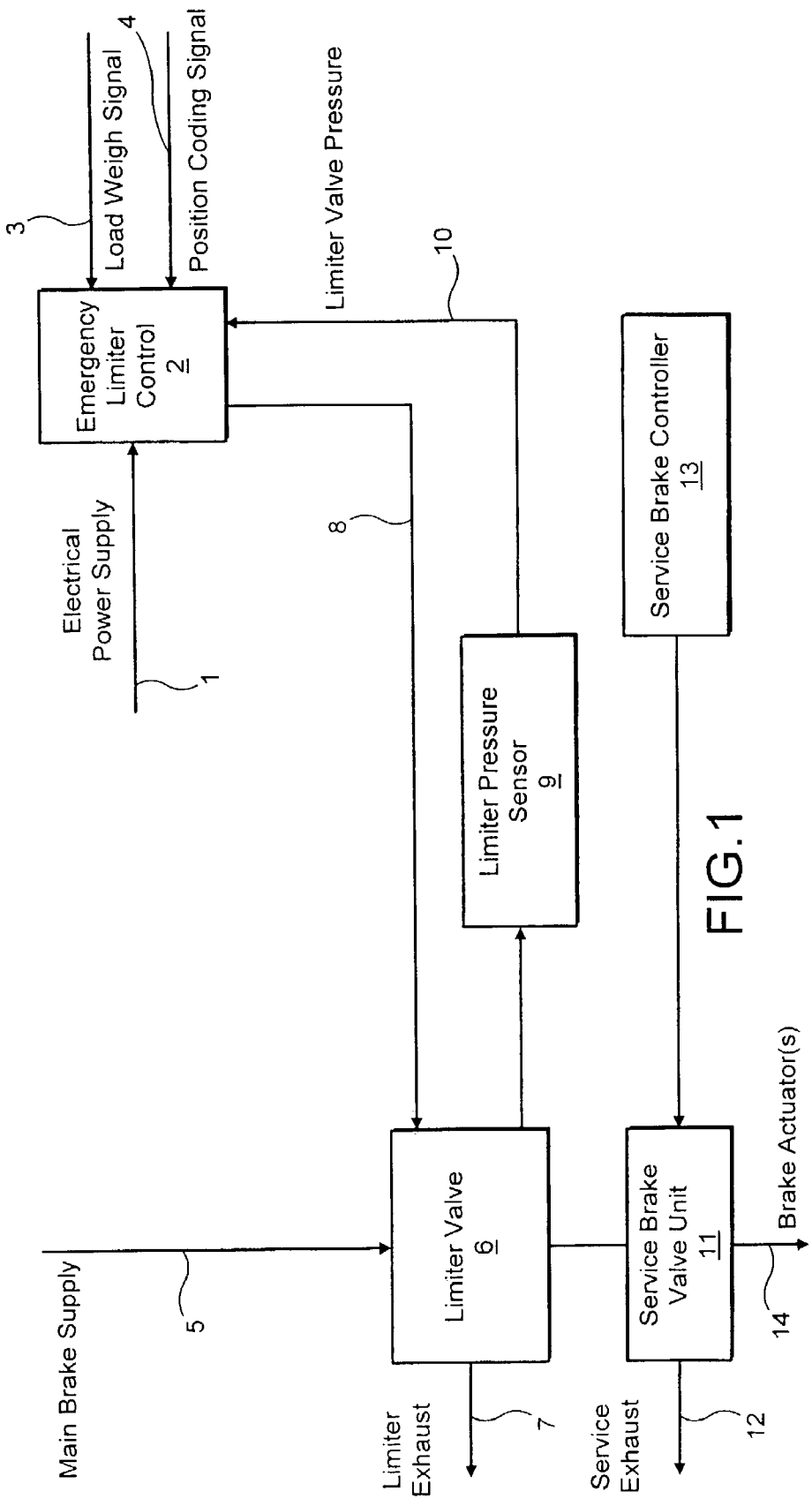

5 Claims, 10 Drawing Sheets

APPARATUS FOR CONTROLLING A BRAKING SYSTEM

FIELD OF THE INVENTION

The present invention relates to apparatus for controlling a braking system under circumstances including situations where the normal electrical supply has failed.

SUMMARY OF THE INVENTION

According to the present invention, there is provided apparatus for controlling a pneumatic braking system under emergency or security brake modes and providing a safe operating envelope for service brake mode, the apparatus including electronic control means which limits the maximum brake pressure even when an external electrical power supply to the braking system is not present.

The apparatus could include additional pneumatic pressure limiting means for maximum and minimum brake pressures in case of failure in a primary electro-pneumatic limiting means.

The apparatus could include means for providing a load weigh signal to increase the brake effort in proportion to vehicle load.

The apparatus could include means for providing a position coding signal to select the characteristics of the limiter function in dependence on the vehicle type and bogie weight at the installed position.

An independent electrical supply could be supplied from a local supply or by an air to electrical converter directly from a pneumatic supply.

An independent electrical supply could be generated by an air to electrical converter which draws its pneumatic supply from one side or the other of at limiter valve or alternatively exhaust air from brake actuation means or from an air suspension system.

CONCISE DESCRIPTION OF THE DRAWINGS

The present invention will now be described, by way of example with reference to the accompanying drawings, in which FIGS. 1, 2, 3, 4, 5, 6, 7, 8, 9 and 10 are block diagrams of examples of apparatus according to the present invention.

Apparatus according to the present invention may operate in conjunction with a normal brake control system providing a safe envelope for the normal system control.

Apparatus to be described by way of example are designed to provide the following functions:

To ensure the pneumatic brake effort will not exceed a specified maximum value under any circumstances.

To ensure that in an emergency situation the brake effort will rise to this designed maximum.

The maximum brake effort can optionally be adjusted in accordance with vehicle loading so that the brake effort is increased as the vehicle load increases. (This ensures the stopping distance in emergency situations is the same for empty and fully loaded vehicles).

The control and operation is carried out electronically, driving normal control valves when the service brake control system is unable to provide that drive or has been deliberately disabled.

In the Figures, the same reference numerals are used to designate the same items.

DETAILED DESCRIPTION OF THE DRAWINGS

Referring first to FIG. 1, electrical power is supplied on a line 1 to an emergency load limiter control 2, to which an electrical load weigh signal on a line 3 and/or a position coding signal on a line 4 may optionally be supplied. Air from a main brake supply pipe 5 is fed to a limiter valve 6 leaving an exhaust outlet 7. Limiter valve 6 receives an electrical signal from the emergency limiter control 2 via a line 8. A limiter valve pressure sensor 9 supplies an electrical signal on a line 10 to emergency limiter control 2. An output from the limiter valve 6 is fed to a service brake valve unit 11, having a service exhaust output 12 and receiving an electrical signal from a service brake controller 13 and having an output supply pipe 14 feeding air to one or more brake actuators.

The optional input position coding signal on line 4 identifies which vehicle type and at which position on that vehicle the system is fitted. The position coding signal is used to select the characteristic of the limiter valve.

Figure 2:
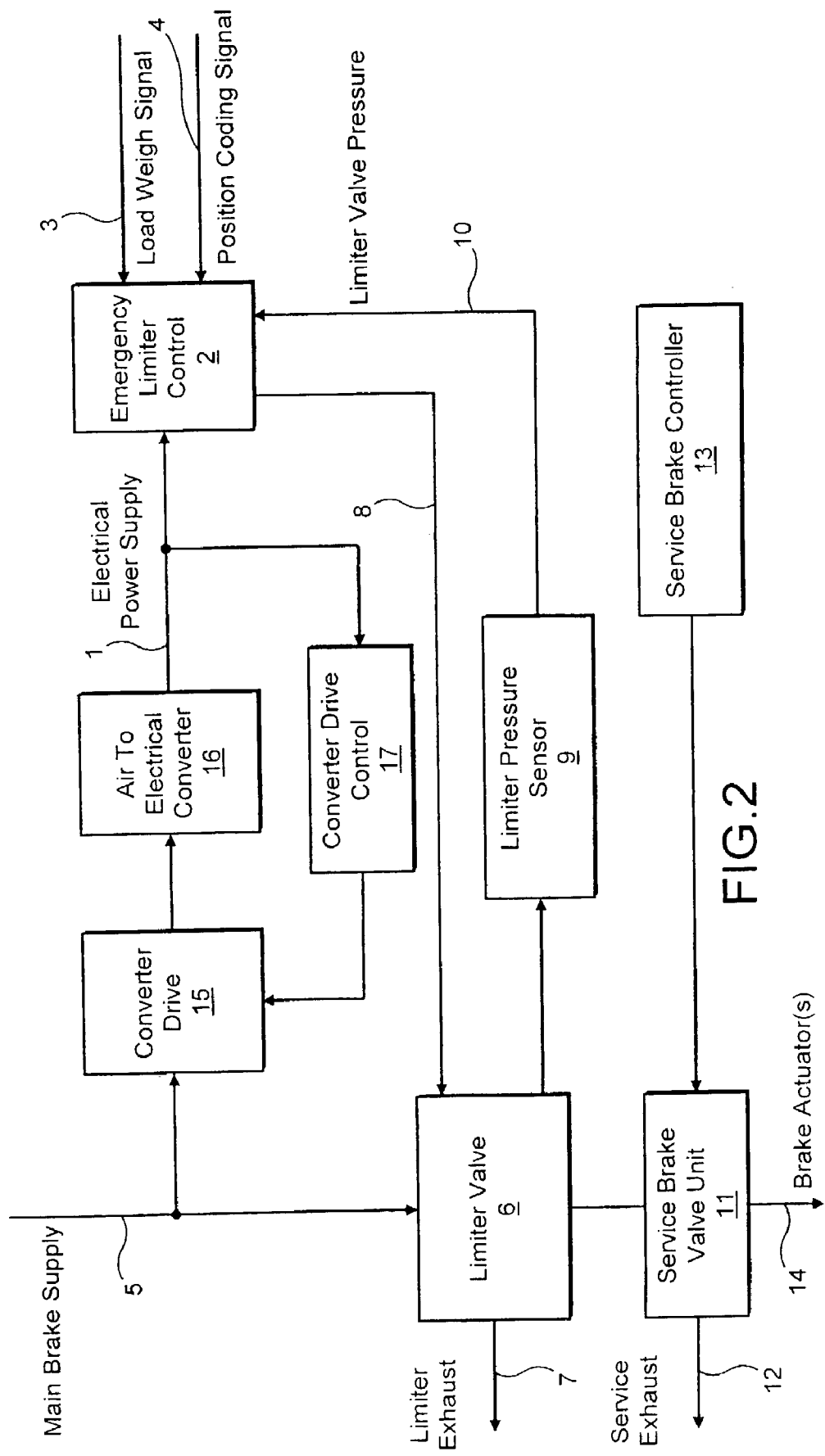

FIG. 2 differs from FIG. 1 in that a converter drive 15 supplies air to an air to electrical converter 16 from main brake air supply pipe 5. Electrical power is supplied on line 1 to emergency limiter control 2. Electrical power from line 1 is also supplied to a converter drive control 17 whose electrical output signal is used to control converter drive 15.

Figure 3:
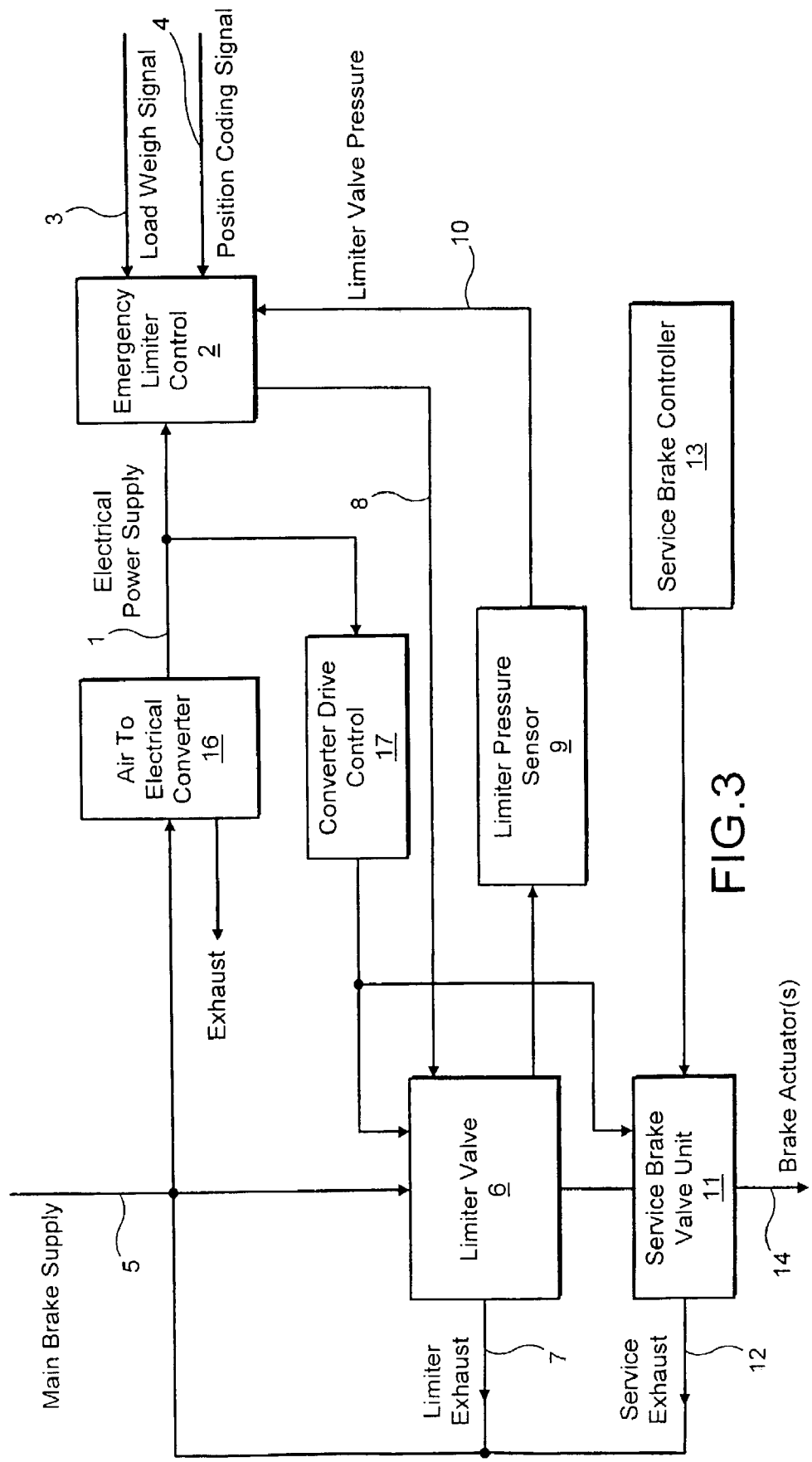

In FIG. 3, exhaust air from the limiter valve 6 and/or exhaust air from the service brake valve unit 11 is fed to air to electrical converter 16 which supplies electrical power on line 1 to the emergency limiter control 2.

Figure 4:
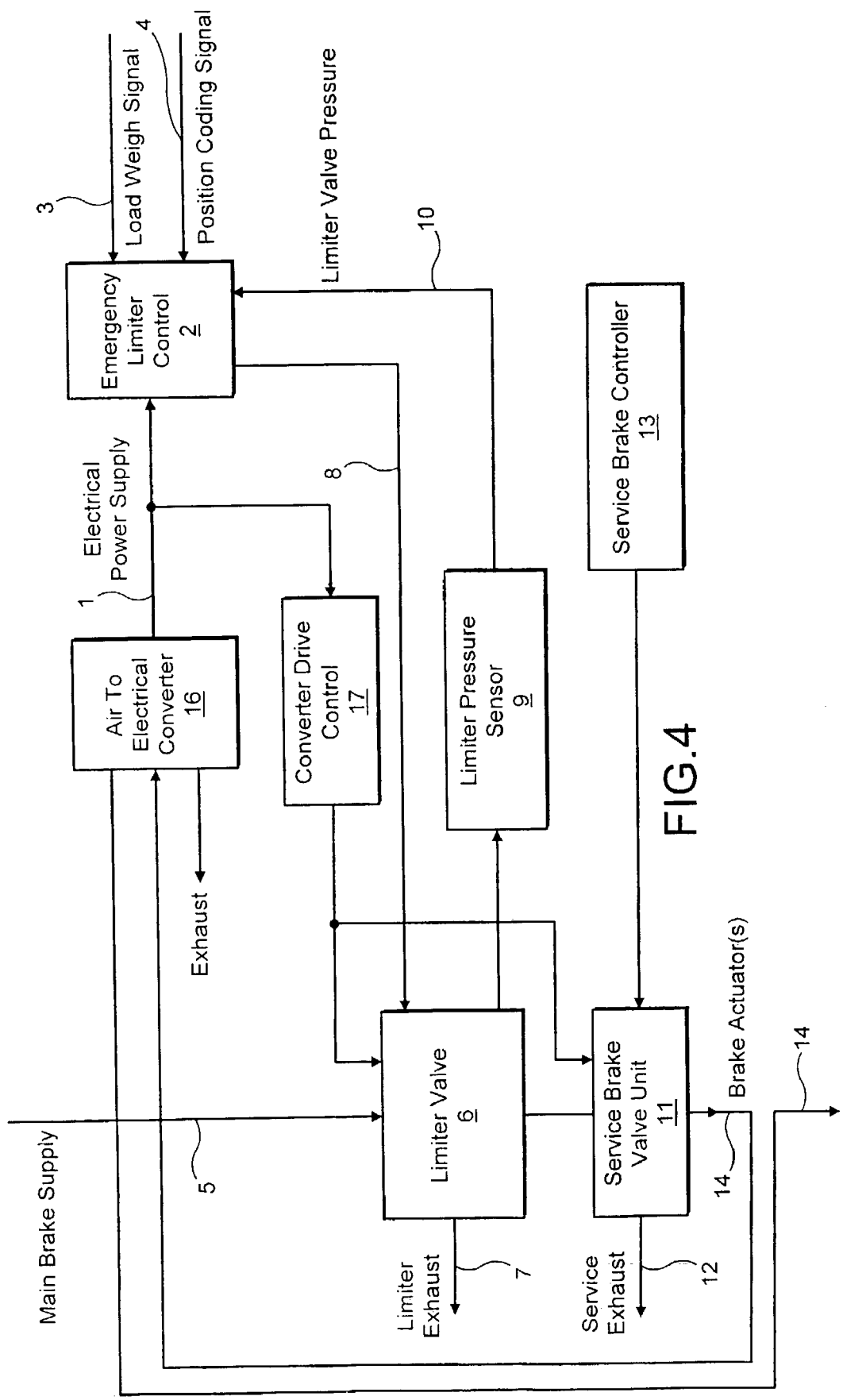

In FIG. 4, air to electrical converter 16 is connected in series with the limiter valve 6 and valve unit 11 in the pipe 14 to the brake actuator(s) and supplies electrical power on line 1 to the emergency limiter control 2.

Figure 5:
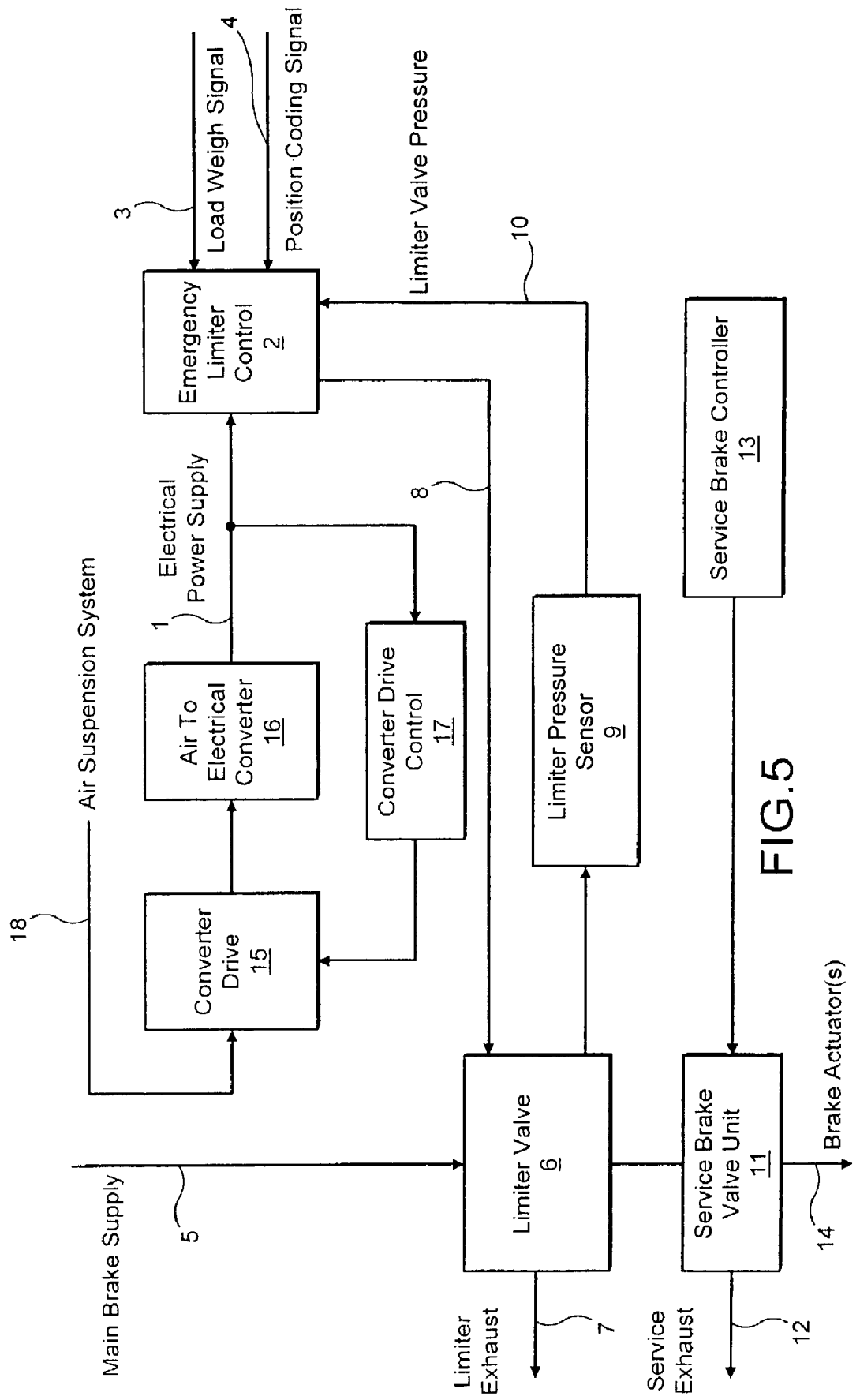
Figure 6:
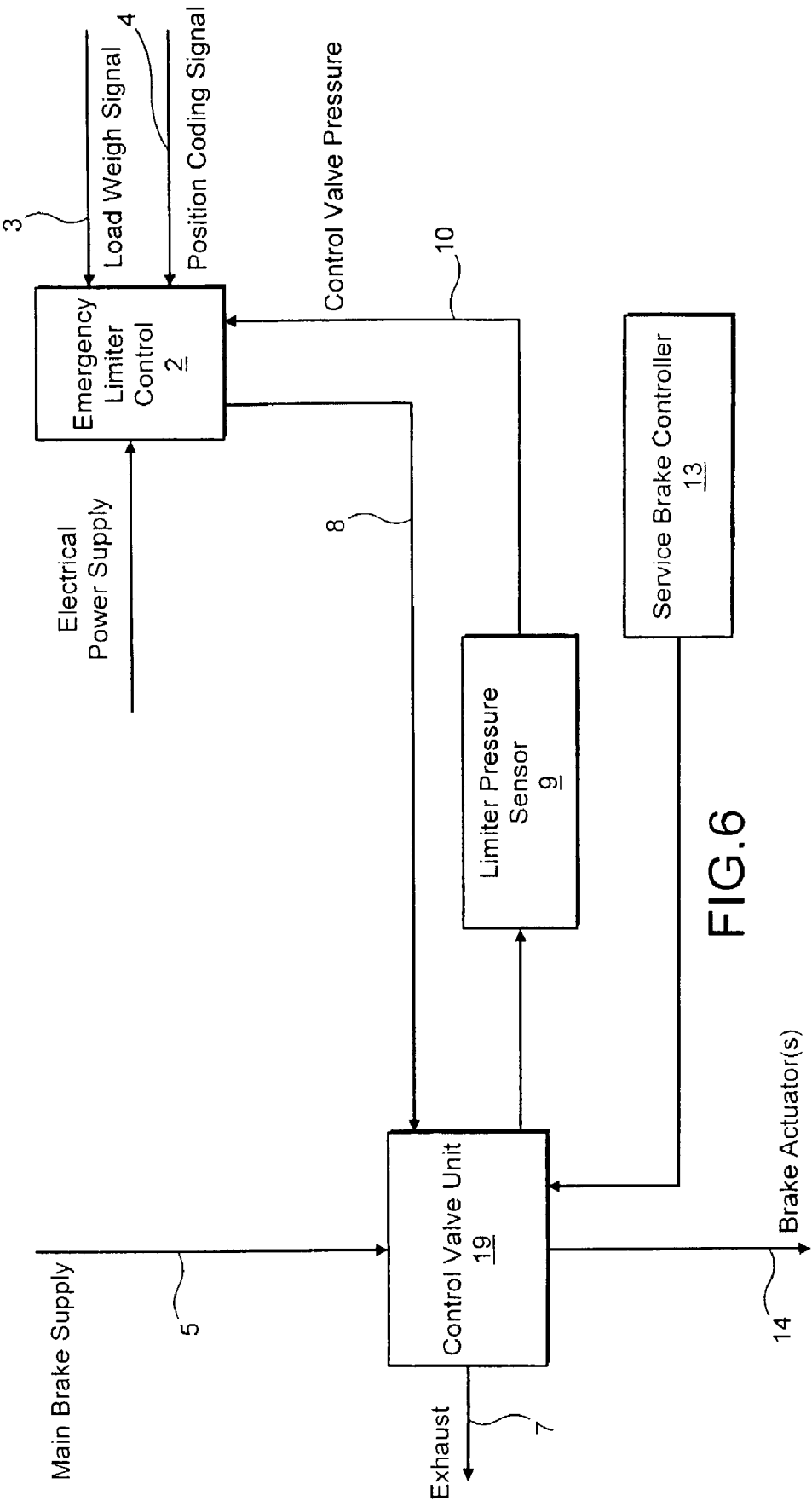

In FIG. 5, air in a pipe 18 from an air suspension system is fed to air to electrical converter 16 which supplies electrical power on line 1 to the emergency limiter control 2.

FIGS. 6 to 10 correspond with FIGS. 1 to 5 respectively with the difference that the limiter valve 6 and the service brake valve unit 11 are combined into a single control valve unit 19.

Operation of the limiter valve control would typically be:

The emergency limiter control 2 monitors the limiter pressure sensor 9 and increases or decreases the limiter valve control pressure demand until the limiter pressure on line 10 equals the setpoint of the emergency limiter control 2.

If the limiter valve output pressure is low, the limiter valve inlet is opened, allowing air to flow from the main brake supply 5 to the output.

If the limiter valve output is high, then the limiter valve exhaust is opened, allowing, air to flow from the output to the exhaust 7.

This process is always available while sufficient pressure is present in the main brake supply pipe 5. Thus, it is possible for the apparatus to be used in emergency or security applications.

The service brake controller 13 provides the normal brake control where the apparatus is operating from the usual electrical supplies, but is protected at all times to operate within the safe working envelope supplied by the limiter valve.

In the apparatus of FIG. 1, 2, 3, 4 and 5, the limiter valve 6 and the service brake valve unit 11 are separated. It is possible that these two valves could be combined into a single control valve unit 19 as shown in FIGS. 6, 7, 8, 9, and 10.

Figure 7:
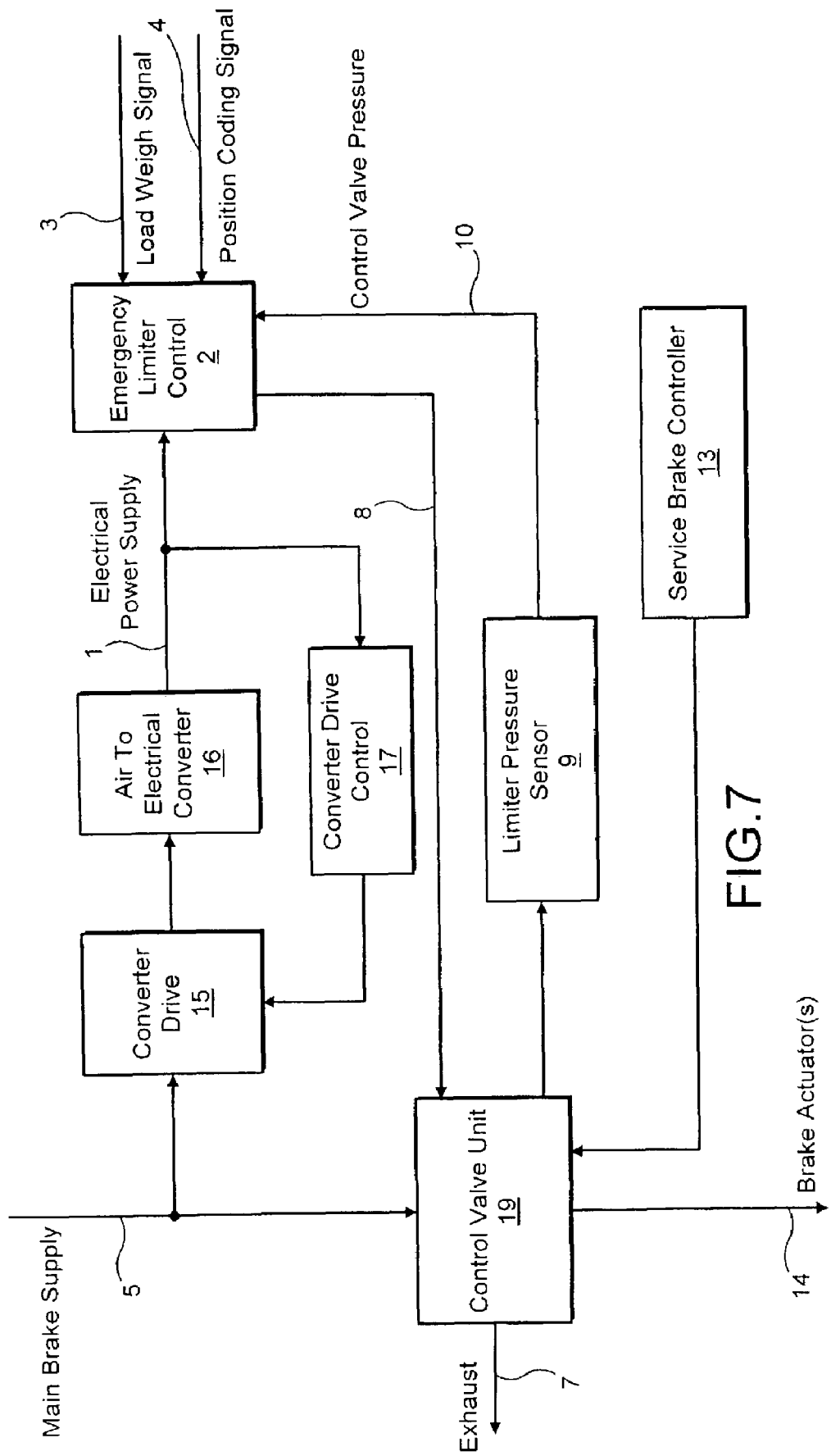

In order to maintain full electronic control when the external electrical supply is not present, air to electrical converter 16 could be used. This could draw air from one of the following sources:

The main brake supply 5 (FIG. 2 or FIG. 7).

The limiter exhaust from 7 of the limiter valve 4 or the service exhaust from 12 of the service brake valve unit (FIG. 3).

Figure 8:
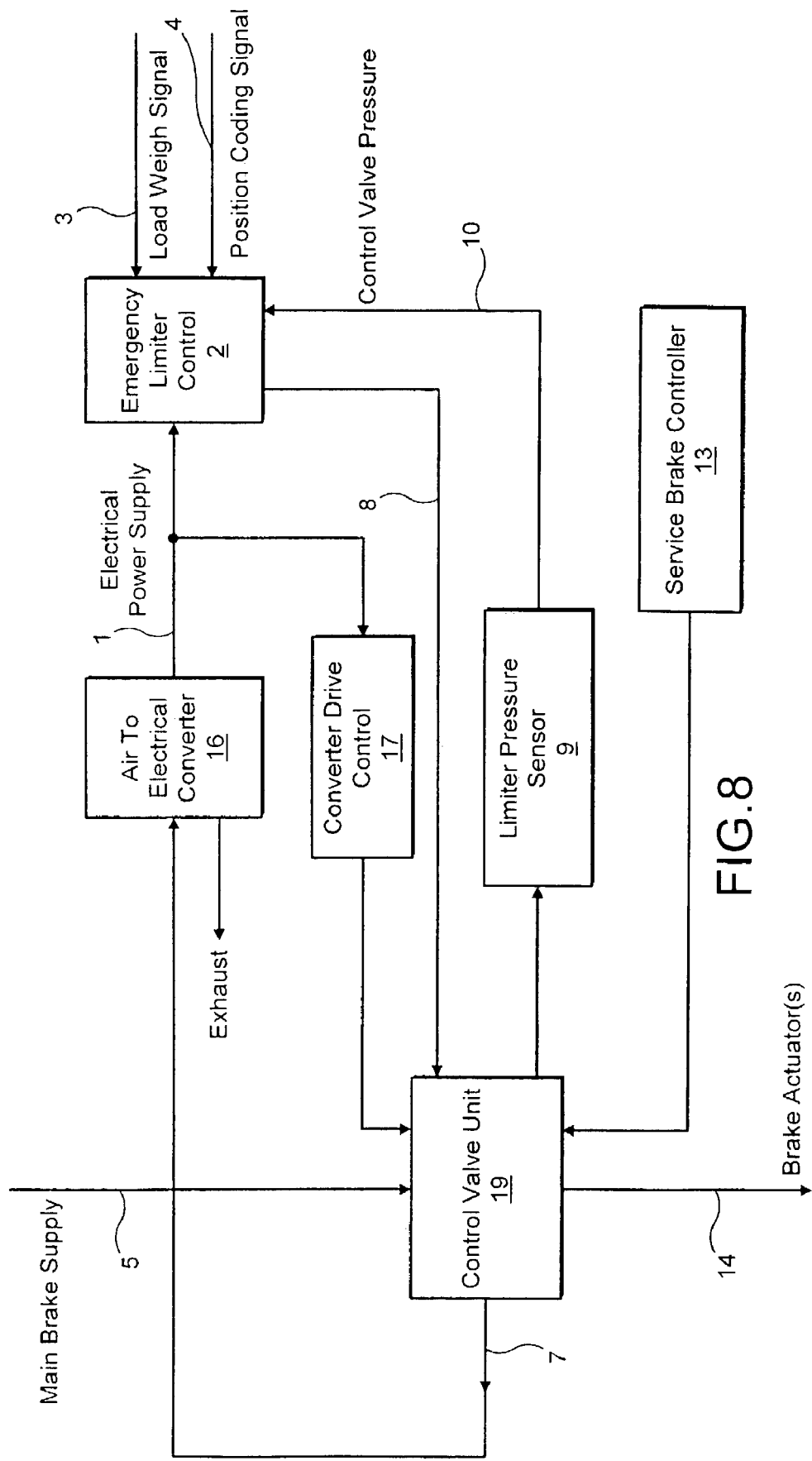

The exhaust from 7 of the control valve unit 19 (FIG. 8).

Figure 9:
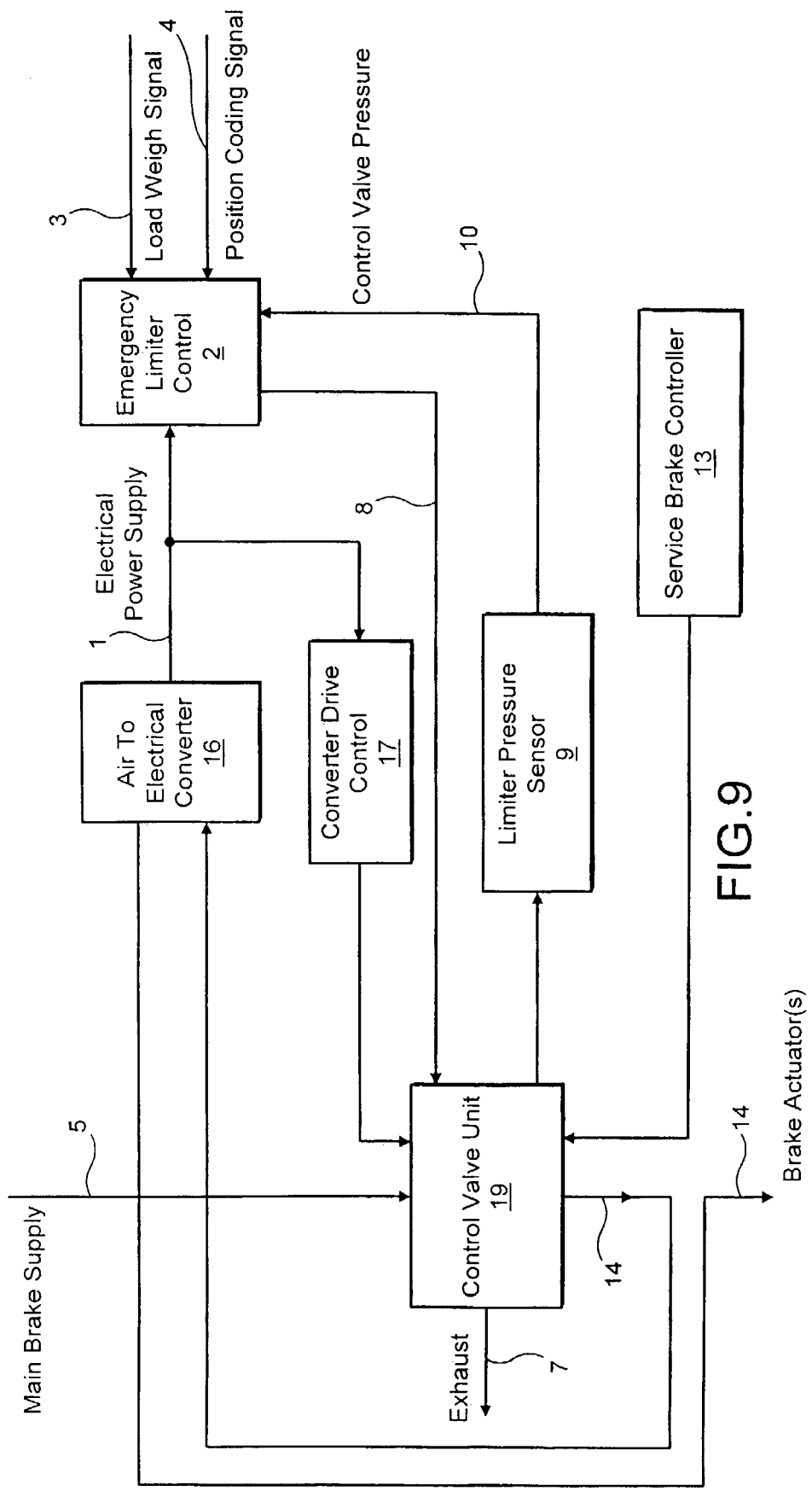

The brake actuator supply pipe 14 (FIGS. 4 and 9).

Figure 10:
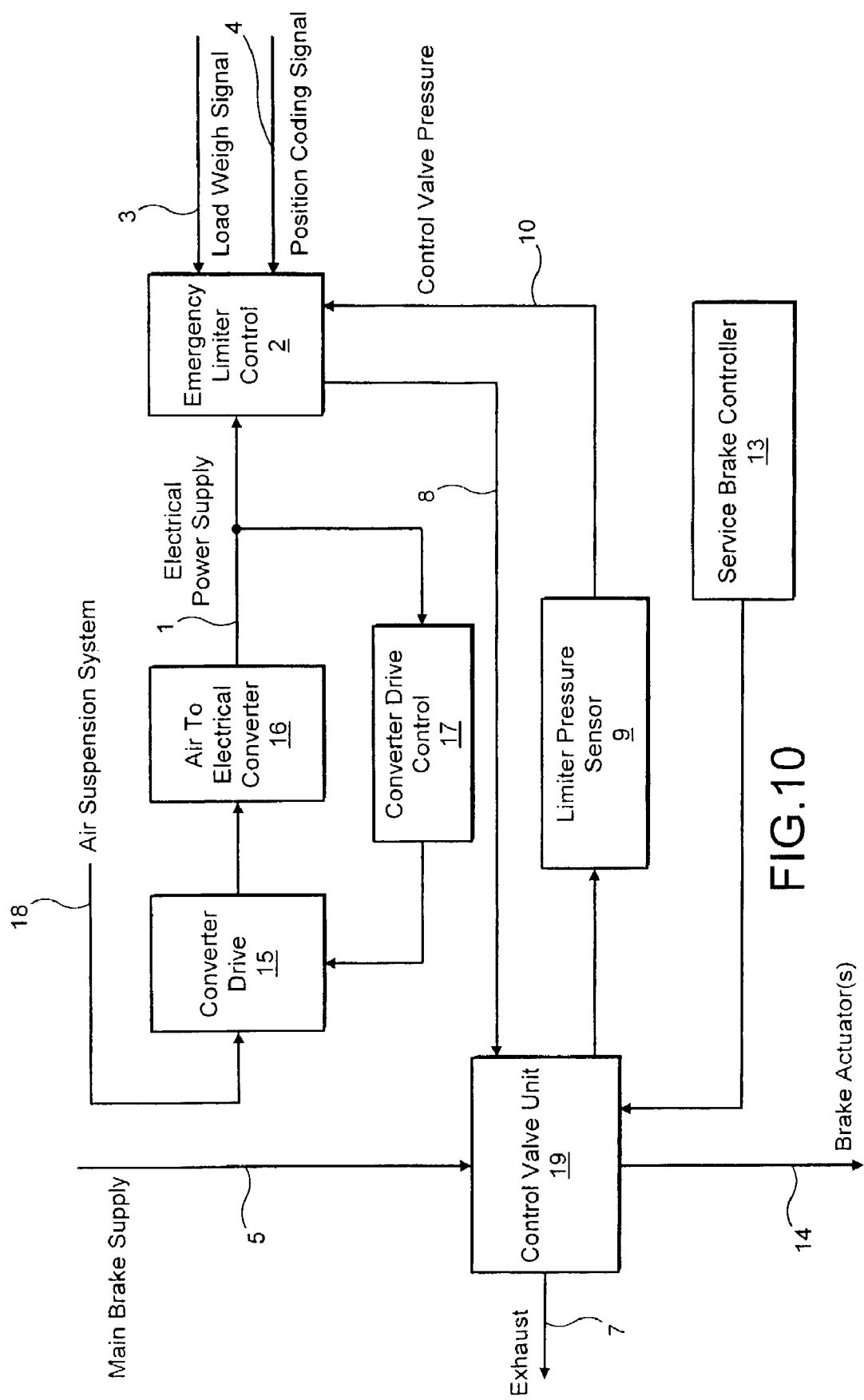

Pipe 18 from the air suspension system (FIGS. 5 and 10).

In FIGS. 2, 3, 4, 5, 7, 8, 9 and 10, to reduce air consumption converter drive control 17 with a converter drive valve is added in series with the air to electrical converter 16. Once the electrical power supply on line 1 has reached the required voltage, the converter drive control 17 switches the converter drive 15, breaking the air supply to the air to electrical converter 16. Once the voltage drops to a lower defined level, the converter drive control 17 switches the converter drive 15, reapplying air to the air to electrical converter 16. However, in FIGS. 3, 4, 8 and 9, where the air to electrical converter 16 draws its air supply from either the brake actuator side of the control valve 6 or the exhaust front 7, the converter drive 15 is not necessarily required. The air consumption can be controlled by switching the valve 6 or unit 19.

Alternatively, as in FIG. 5, the air to electrical converter 16 can be arranged to receive its air supply from the converter drive 1 via pipe 18 from the air suspension system.

FIGS. 1, 2, 3, 4 and 5 show service brake valve unit 11 downstream of the limiting valve 6, but equally the service brake valve unit 11 could be fitted upstream of the control valve 6.

The invention claimed is:

1. An electro-pneumatic brake system comprising a service brake controller and a main brake supply pipe, adapted to feed air to a first valve and a second valve arranged in series with said first valve, the system further comprising an electronic control means, adapted to control said first valve, independent of said service brake controller and an independent electrical supply adapted to power said electronic control means, wherein the system further comprises a pressure sensor to monitor the pressure in the first valve and supplies an electrical signal to the electronic control means, the first valve being adapted to prove a safe operating envelope for service brake mode and permit a maximum brake effort in an emergency situation said service brake controller controls the second valve in a normal situation to provide service braking and in an emergency situation the electronic control means controls the first valve independent of said service brake controller in response to a signal from a pressure sensor such that the maximum necessary brake effort is applied.

2. An electro-pneumatic brake system according to claim 1, wherein the system further comprises means for providing a load weigh signal to increase the brake effort in proportion to vehicle load.

3. An electro-pneumatic brake system according to claim 1, wherein the system further comprises means for providing a position coding signal to the electronic control means thereby enabling selection of the characteristic of the limiter function dependent on the vehicle type and bogie weight at the installed position.

4. An electro-pneumatic brake system according to claim 1, wherein the independent electrical supply is generated by an air-to-electrical converter directly from the pneumatic supply.

5. An electro-pneumatic brake system according to claim 1, wherein the independent electrical supply is generated by an air-to-electrical converter which draws its pneumatic supply from one side or the other of a limiter valve or alternatively exhaust air from brake actuation means or from an air suspension system.

* * * * *